United States Patent [19]

Huang

[11] Patent Number: 5,168,965
[45] Date of Patent: Dec. 8, 1992

[54] BYPASS VALVE WITH SELECTIVE CHARACTERISTICS FOR CONTROLLED AND ADJUSTABLE DASHPOTS

[75] Inventor: Zhen Huang, Wuppertal, Fed. Rep. of Germany

[73] Assignee: August Bilstein GmbH & Co. KG, Ennepetal, Fed. Rep. of Germany

[21] Appl. No.: 615,442

[22] Filed: Nov. 16, 1990

[30] Foreign Application Priority Data

Dec. 22, 1989 [DE] Fed. Rep. of Germany ....... 3942477

[51] Int. Cl.⁵ .......................... F16F 5/00; F16F 9/00; F16F 9/34; F16F 9/49
[52] U.S. Cl. ............................... 188/319; 188/322.15; 188/280; 188/299; 188/379
[58] Field of Search ................... 188/319, 280, 322.15, 188/379, 283, 299, 322.5, 282, 285, 266, 269, 279, 297

[56] References Cited

U.S. PATENT DOCUMENTS

| 4,660,686 | 4/1987 | Münning et al. ..................... 188/319 |
| 4,997,068 | 3/1991 | Ashiba ................................. 188/319 |

Primary Examiner—Joseph F. Peters, Jr.
Assistant Examiner—Kenneth Lee
Attorney, Agent, or Firm—Max Fogiel

[57] ABSTRACT

A bypass valve with selective characteristics for controlled and adjustable dashpots. It has pressure-activated check valves that are reversed by means of a slide that can assume two positions and is activated by an electromagnet. Springs can be designed to dictate the characteristic of the dashpot independent of the type of piston employed.

8 Claims, 1 Drawing Sheet

BYPASS VALVE WITH SELECTIVE CHARACTERISTICS FOR CONTROLLED AND ADJUSTABLE DASHPOTS

BACKGROUND OF THE INVENTION

The invention concerns a bypass valve with selective characteristics for controlled and adjustable dashpots of the type employed in motor vehicles. Such dashpots consist of a cylinder that usually accommodates an attenuating fluid. A sealed-off piston rod travels into and out of the cylinder and has a piston that separates the cylinder into compartments, one high-pressure and the other low-pressure. The piston accommodates chokes that are subject to the force of springs.

A dashpot of this type is known from German Patent 3 704 712.

An adjustable hydraulic dashpot is known from German OS 3 711 442. It has valves in its piston. The axially moving valve body is adjusted with a wire that varies its length by way of controls.

German OS 3 631 714 discloses a hydraulic dashpot that has in addition to the other valves a bypass valve inside its piston. The bypass valve is controlled with an electromagnet. Various attenuating forces can be established by engaging the bypass in the piston along with another bypass in a bottom valve.

A hydraulic dashpot with a variable attenuation force can be derived from German OS 3 608 738. A bypass with two independently adjustable rotating slides ensures independent establishment of the attenuation force in both the pressure and the vacuum stage. The two slides create access channels with variable cross-sections inside the bypass. Also associated with each channel is a check valve. The first check valve closes during the vacuum stage and the second during the pressure stage.

German OS 3 608 841 discloses a shock absorber with a variable attenuation characteristic. A control slide with a slotted diaphragm allows the attenuating fluid through, and the motion of the slide is supposed to be unaffected by the traveling fluid.

SUMMARY OF THE INVENTION

The object of the invention is a bypass valve with selective characteristics for controlled and adjustable dashpots of the type employed in motor vehicles whereby any bypass access can be selected. The number of components employed should be small, and the bypass should allow obtaining a desired characteristic in conjunction with a commercially available piston in both the pressure and the vacuum stages.

The advantage of this bypass valve is that it has few parts. It is particularly important in relation to semi-active chassis that operate on the skyhook principle to easily select a characteristic for the dashpot or dashpots. The instant bypass valve requires no additional sensors. The controls are separate from the actual piston. The disengagement of the piston shifts the change in cross-section out into the bypass valve in order to construct a characteristic. The bypass valve is not just a strictly pressure-activated valve but is also employed to control the characteristic. The bypass valve accommodates controlled check valves with thresholds of response that can be varied in accordance with the resistance or rigidity of their associated springs.

The instant invention makes it possible to establish one characteristic for the pressure stage and another for the vacuum stage in accordance with the particular situation. "activation" in this context refers not only to the magnet in the bypass valve but also to the valve itself. Any desired characteristic can be attained for the dashpot in accordance with the particular springs employed. The bypass valve is a valve with a slide that is not integrated into the interior of the piston. A bypass valve of this type can be utilized to reliably control a semi-active chassis without difference-in-speed sensors and in accordance with the particular situation. Without the bypass the piston will have a very definite characteristic specific to the vehicle. Such a characteristic can also be optimized with such a bypass valve. Optimizing the characteristic of the piston itself and its controls will facilitate selection of the piston's overall characteristic. The attenuating piston can accordingly be a commercially available piston.

The control theory behind the bypass valve will now be described.

With no electricity being supplied to it, the control slide will be at rest, and the characteristic will accordingly be dictated during the pressure stage by the springs in the check valve. The bypass is simultaneously closed to the vacuum stage by an appropriate check valve with the slide in the same position.

When the slide is in the second position, going into its upper position with electricity flowing through the magnet, that is, the check valve is closed during the pressure stage, and all the fluid is forced through the valves in the piston. The vacuum stage is simultaneously subjected to the check valve's bypass characteristic while the slide is in this position.

DESCRIPTION OF THE PREFERRED EMBODIMENTS

Figure 1:
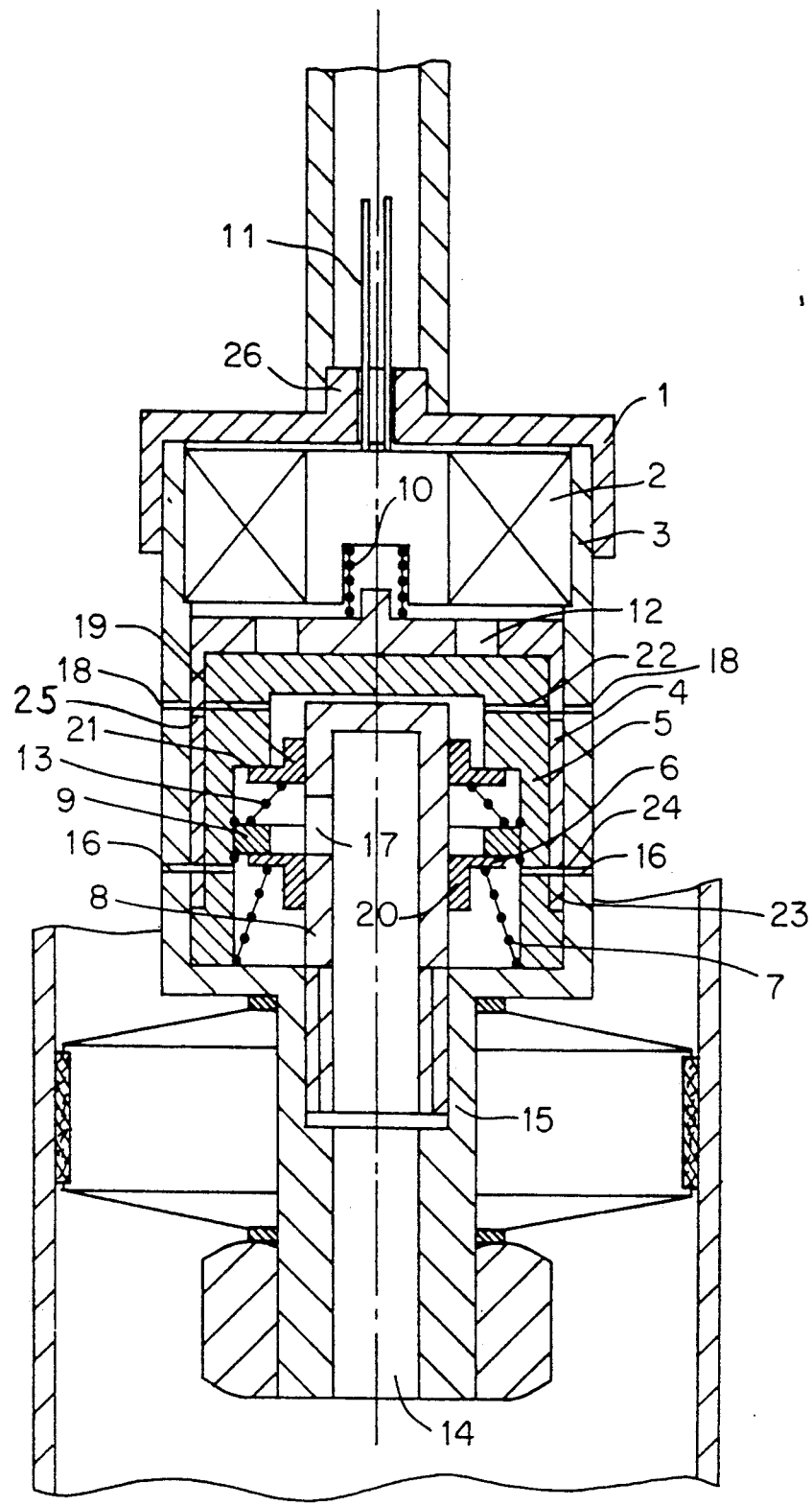
FIG. 1 is a partial sectional view of the check value, in accordance with the present invention.

The invention will now be described in detail with reference to the schematic drawing. FIG. 1 illustrates a check valve in accordance with the invention. This bypass valve can be connected to an attenuating piston inside the dashpot by way of a piston accommodation 15. On the opposite side the piston rod is connected to the bypass valve by way of a piston-rod connection 26. Inside the bottom 3 of the housing are an electromagnet and controls for the bypass. For reasons of manufacturing technology, the bypass valve is rotationally symmetrical. The axle accommodates an inner component 8 with bypass-access channels 17 in its upper third. Mounted on inner component 8 are moving valves 20 and 19. These valves are forced against a supporting ring 9 and another inner component 5 by springs 13 and 7. What kind of springs are employed depends on the desired eliminate to be attained by the bypass valve. Inner component 5 rests over inner component 8 and has in alignment therewith two bypass channels 22 and 23 distributed at equal intervals around it. These bypass channels are independent. One is associated with the pressure stage and the other with the vacuum stage. The appropriate channel is accordingly always associated with the appropriate check valve.

A valve slide 4 fits around rotationally symmetrical inner component 5. Valve slide 4 has matching bypass channels 25 and 24 and is secured in a rest position by a spring 10. The slide is shifted out of its rest position by activating an electromagnet 2 by way of electric lines 11. To prevent any attenuating fluid that may collect above valve slide 4 from creating a cushion, bottom 3 of the housing has equalization bores 12. In the rest position, when, that is, no electricity is flowing through the electromagnet, bypass channels 16, 24, and 23 are all at the same level and the attenuation fluid can travel through them unimpeded. This position represents the attenuation valve's pressure stage. Check valve 20 is subjected to the pressure in bypass passage 14. The valve will, depending on its resistance, open at a prescribed pressure, allowing the fluid to flow through bypass channels 16, 23, and 24 into the upper half of the cylinder. If the slide remains in this position and if the pressure stage is initiated, the bypass channels will be closed off by check valve 20 and the attenuating fluid will be forced through the valves in the piston.

If electricity now begins flowing through electromagnet 2, it will attract valve slide 4 and close off bypass channels 16, 23, and 24. Another channel will be opened on the other side, however, and bypass channels 18, 22, and 25 will come into alignment. The attenuating fluid accumulating above the piston can accordingly leave through the aforesaid bypass openings and arrive at check valve 19, which is also secured in a rest position by a spring 13. The tension and rigidity of this spring also dictates how much attenuating fluid can travel through. If the pressure is powerful enough, check valve 19 will open and the fluid will enter the bottom of the cylinder through bypass channel 17 and bypass passage 14. With valve slide 4 in this second position, the pressure stage is blocked off and the attenuating fluid is forced through the valves in the piston. The vacuum stage, however, will simultaneously be activated in this position, and the attenuating fluid will be able to flow through bypass channels 18, 22, and 25.

Valve slide 4 can be activated by an appropriate computer in the vehicle in accordance with the particular controls philosophy employed. Since valve slide 4 can assume only two positions, this bypass valve is especially appropriate for semi-active chassis. It is also possible to establish one characteristic for the pressure stage and another for the vacuum stage by designing the springs accordingly. The object of the instant invention can be employed to adjust and establish the characteristic independent of what make of piston is employed. Specific controls philosophies can also always be implemented by activating the electromagnet in various ways.

I claim:

1. A bypass valve with selective characteristics for controlled and adjustable dashpots in motor vehicles, comprising: a cylinder with an inside containing attenuating fluid; a piston and piston rod moving axially in and out of said cylinder; said piston being secured to said rod and dividing the inside of said cylinder into two chambers that are alternately under pressure and vacuum depending on the direction of movement of said piston; fluid-access channels for generating an attenuating force; said fluid-access channels having an effective cross-section dependent on throttles receiving upstream fluid flowing from one of said chambers that is under pressure in said cylinder for adjusting against resilient force; a bypass passage in said piston rod and having an adjustable cross-section; a bypass controlled valve with a sleeve-shaped valve slide for adjusting said cross-section of said bypass passage; a single electromagnet for actuating said valve slide against spring action; said bypass controlled valve being arranged in an expanded space of said piston rod; at least two coaxial pressure-actuated check valves in said expanded space of said piston rod; said two chambers comprising an upper chamber and a lower chamber, one of said check valves opening when said upper chamber is pressurized, and the other one of said two check valves opening when said lower chamber is pressurized; said sleeve-shaped valve slide being arranged to connect at any one time only one check valve with one chamber.

2. A bypass valve as defined in claim 1, wherein said valve slide connects said upper chamber to said lower chamber through two bypass channels, a check valve, and said bypass passage when said valve slide is at rest in a pressure stage.

3. A bypass valve as defined in claim 1, wherein said bypass cross-section is blocked during a vacuum stage.

4. A bypass valve as defined in claim 1, wherein said exterior axially movable valve slide connects said upper chamber to said lower chamber through two bypass channels, a check valve, and said bypass passage.

5. A bypass valve as defined in claim 1, wherein said bypass cross-section is blocked during a pressure stage.

6. A bypass valve as defined in claim 1, including springs on said check valves, said check valves having characteristics dependent on said springs.

7. A bypass valve as defined in claim 1, wherein said valve slide connects said upper chamber to said lower chamber through three bypass channels, a check valve, and said bypass passage when said valve slide is at rest in a vacuum stage.

8. A bypass valve with selective characteristics for controlled and adjustable dashpots in motor vehicles, comprising: a cylinder with an inside containing attenuating fluid; a piston and piston rod moving axially in and out of said cylinder; said piston being secured to said rod and dividing the inside of said cylinder into two chambers that are alternately under pressure and vacuum depending on the direction of movement of said piston; fluid-access channels for generating an attenuating force; said fluid-access channels having an effective cross-section dependent on throttles receiving upstream fluid flowing from one of said chambers that is under pressure in said cylinder for adjusting against resilient force; a bypass passage in said piston rod and having an adjustable cross-section; a bypass controlled valve with a sleeve-shaped valve slide for adjusting said cross-section of said bypass passage; a single electromagnet for actuating said valve slide against spring action; said bypass controlled valve being arranged in an expanded space of said piston rod; at least two coaxial pressure-actuated check valves in said expanded space of said piston rod; said two chambers comprising an upper chamber and a lower chamber, one of said check valves opening when said upper chamber is pressurized, and the other one of said two check valves opening when said lower chamber is pressurized; said sleeve-shaped valve slide being arranged to connect at any one time only one check valve with one chamber, said exterior axially movable valve slide connecting said upper chamber to said lower chamber through two bypass channels, a check valve, and said bypass passage; said effective bypass cross-section being blocked during a vacuum stage; and spring means on said check valves, said check valves having characteristics dependent on said spring means.

* * * * *